United States Patent

[11] 3,612,483

[72] Inventor Eldert B. Pool
  Pittsburgh, Pa.
[21] Appl. No. 720,941
[22] Filed Apr. 12, 1968
[45] Patented Oct. 12, 1971
[73] Assignee Rockwell Manufacturing Company
  Pittsburgh, Pa.

[54] VALVES WITH DEFORMABLE SEALING
  24 Claims, 14 Drawing Figs.
[52] U.S. Cl. .................................................. 251/306,
  251/315, 251/326, 251/327, 251/333, 277/75
[51] Int. Cl. .................................................. F16k 1/22,
  F16k 3/00, F16k 5/06
[50] Field of Search .................................... 277/75, 76,
  226; 251/170, 172, 173, 175, 324, 325, 326, 327,
  328, 333, 305–308, 309, 314, 316, 317, 171

[56] References Cited
  UNITED STATES PATENTS
| 2,867,482 | 1/1959 | Schmidt | 277/75 |
| 3,084,715 | 4/1963 | Scharres | 251/306 X |
| 3,269,695 | 8/1966 | Grove | 251/327 X |
| 2,970,802 | 2/1961 | Guerrero | 251/172 |
| 2,071,780 | 2/1937 | Aghnides | 285/110 X |
| 2,469,516 | 5/1949 | Pearson | 285/112 X |
| 2,754,136 | 7/1956 | Phillips | 285/112 X |
| 3,356,336 | 12/1967 | Maenaka | 251/306 |
| 3,394,914 | 7/1968 | Nagasato | 251/306 |
| 3,401,915 | 9/1968 | Kim | 251/174 |
| 3,458,171 | 7/1969 | Urban | 251/170 |

FOREIGN PATENTS
| 638,395 | 4/1962 | Italy | 251/306 |

Primary Examiner—Henry T. Klinksiek
Attorney—Strauch, Nolan, Neale, Nies & Kurz

ABSTRACT: A valve assembly comprises a relatively rigid member defining a fluid flow port and a movable member adapted to engage the port with a fluidtight fit. One of the members is formed with an annular recess in which is mounted a resilient seal ring adapted to engage and be compressed against the rigid member to provide a sealing closure. This seal ring has its opposite sides sealed and maintained immovable as by suitable bonding or clamping to the opposite sides of the recess. A space is provided internally of the seal of such volume that deformation of the compressed seal ring in engagement with the rigid valve member does not fill the space, and that space is vented for pressure equalization.

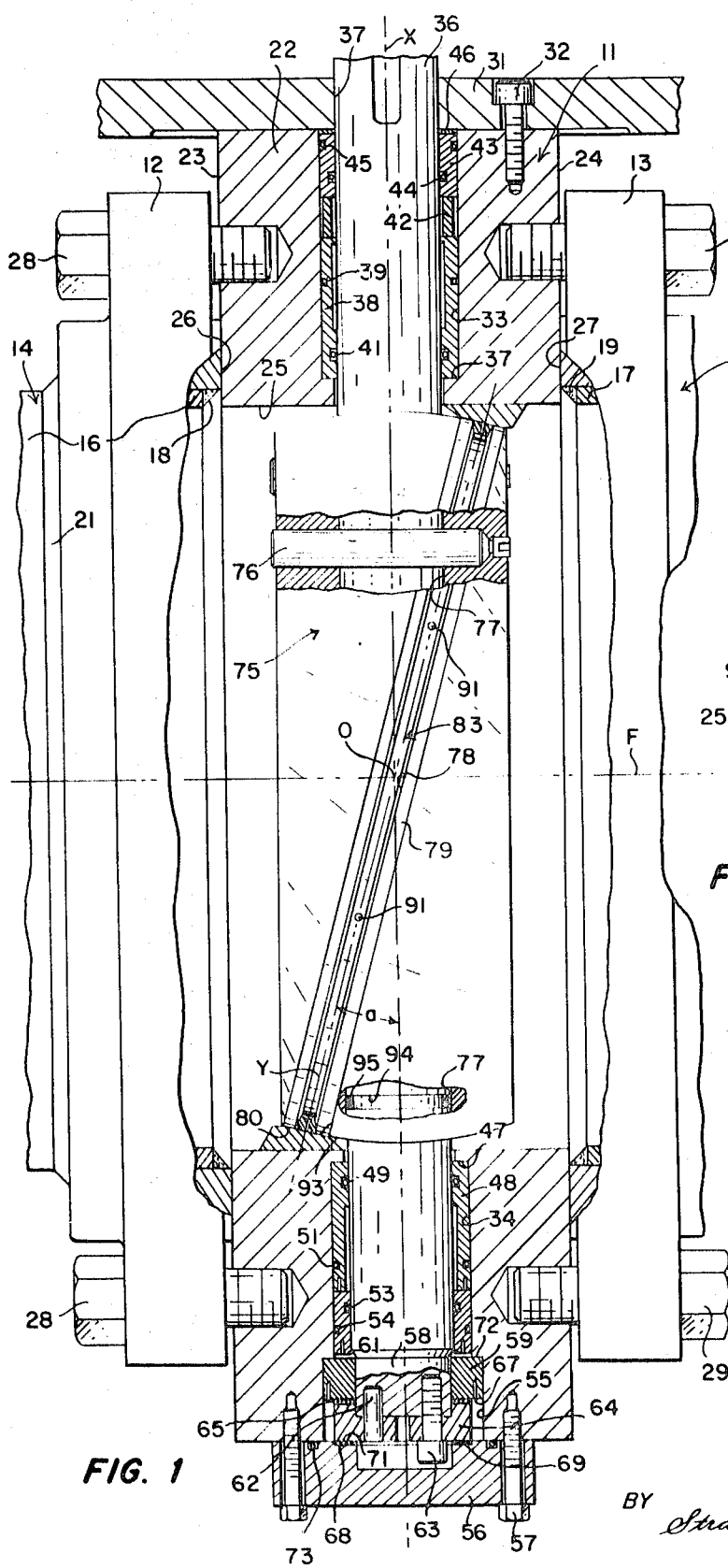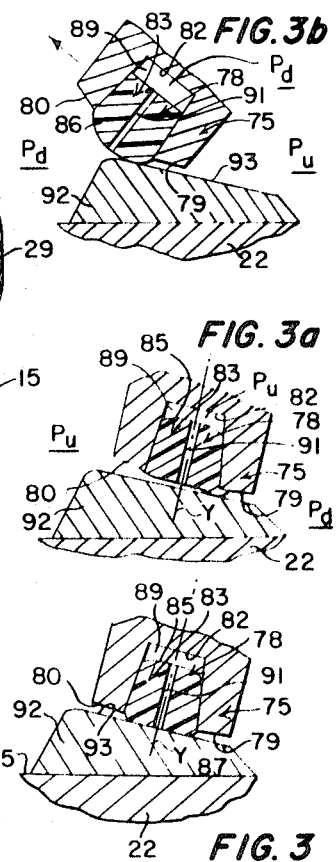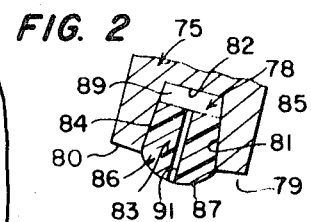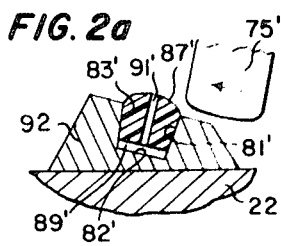
FIG. 1
FIG. 2
FIG. 2a
FIG. 3
FIG. 3a
FIG. 3b
INVENTOR
ELDERT B. POOL
BY Strauch, Nolan, Neale, Nied & Kurz
ATTORNEYS INVENTOR
ELDERT B. POOL
BY
Strauch, Nolan, Neale,
Nies & Kurz
ATTORNEYS

INVENTOR
ELDERT B. POOL

BY Strauch, Nolan, Neale, Nies & Kurz
ATTORNEYS

INVENTOR.
ELDERT B. POOL
BY
Strauch, Nolan, Neale,
Nies & Kurz
ATTORNEYS

INVENTOR
ELDERT B. POOL

BY Strauck, Nolan, Neale,
Nies & Kurz
ATTORNEYS

VALVES WITH DEFORMABLE SEALING

BACKGROUND AND SUMMARY OF INVENTION

This invention relates to flexible seals in valves or similar devices where the seal must leave the protection of complete confinement during the opening or closing of a fluid flow port. Flexible seals are subject to excessive distortion from the fluid pressure and from frictional forces. This excessive distortion exposes them to damage either directly or by interference with adjacent rigid moving members.

Many valve structures have been proposed wherein a flexible lip or like sealing element engages a rigid valve seating surface when the valve is in closed condition, but none of these has solved the problem of excessive wear and damage attendant to normal operation.

The present invention provides a novel arrangement for preventing excessive distortion and resulting damage to the seal in a valve assembly while preserving its flexibility and consequent sealing ability when in the sealing position or positions.

The objective is achieved by providing the following:

1. A continuous recess around the valve port in one of the members to be sealed.

2. In this recess a flexible member is so mounted as to maintain continuous sealing contact without relative motion with respect to both sides of the recess under all conditions of pressure or other forces.

3. The flexible member has a smoothly contoured crown with positive interference with the mating rigid sealing surface when in sealing position.

4. At the same time a space or void is maintained internally of the seal, at the bottom of the recess or within the seal ring, of sufficient volume to prevent the flexible member from completely eliminating the void in its most compressed position at maximum interference.

5. This space or void, otherwise sealed, is vented through one or more passages, which are small in width in relation to the seal width, preferably located in the flexible member essentially in the plane of symmetry of the recess and flexible member.

The foregoing represents a major object of the invention.

This invention is intended to include any seal which incorporates all of the foregoing elements. The flexible member may be relatively thin metal, relatively thicker plastic such as nylon or Teflon or an elastomer such as any of the synthetic rubbers. The flexible member of the seal is maintained in sealing contact and immovable at the recess sidewalls by mechanical means such as clamping on assembly, by precompression of an elastomer or other spring adequate for the pressure rating, or by surface bonding of the flexible member to the recess sidewalls.

The purpose of the space or void is to prevent hydrostatic compression of the sealing material with resultant loss of flexibility. The purpose of the vent passages is threefold. They balance the fluid pressure in the space with that of the line, preventing distortion of the flexible member from hydrostatic pressure along. They pressure energize the seal on the low or downstream pressure side upon engagement with the rigid mating member. They deenergize the same area as contact is broken with the mating surface. Thus the sealing qualities of a lip seal are preserved, but the disadvantage of excessive distortion due to maintaining pressure sealing contact during a wide separation of the valve parts is avoided. Also catching of a lip in sliding over the port is avoided by the edgeless smooth crowned surface presented to the port. The sealing attachment of the flexible member to both sides of the recess limits pressure energized distortion of the seal. This prevents such excess distortion and dislocation as is common with unbonded or unclamped seals such as O-rings when the adjacent parts are separated while subject to fluid pressure.

The invention is applicable to globe, butterfly, parallel or wedge gate, ball, plug, spool or other type of valve port seal.

Objects of the invention involve means and specific structure for accomplishing the foregoing.

BRIEF DESCRIPTION OF DRAWINGS

FIG. 1 is a side elevation partially broken away and in section showing a butterfly-type valve according to a preferred embodiment of the invention mounted in a pipeline;

FIG. 2 is an enlarged fragmentary section showing the seat ring of the movable valve part in FIG. 1 in relaxed condition, as when the valve is open;

FIG. 2a is a fragmentary section showing the seal ring mounted at the body seating surface according to an embodiment;

FIG. 3 is a fragmentary section showing the seat ring of the disc in FIGS. 1 and 2 in compressed condition when the valve is closed;

FIG. 3a is a view similar to FIG. 3 and showing pressure energization of the seal by upstream pressure;

FIG. 3b is another view similar to FIG. 3 and showing pressure equalization at the seal when the valve opens;

PREFERRED EMBODIMENTS OF THE INVENTION

Figure 5:
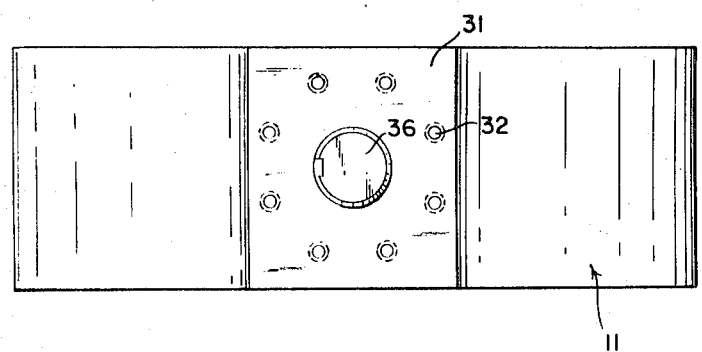
FIG. 5 is a top plan view of the valve of FIGS. 1–4.

Referring to FIGS. 1–4, a pivoted disc or butterfly-type valve assembly 11 is mounted between opposed end flanges 12 and 13 on pipeline sections 14 and 15 respectively. FIG. 1 is broken away to show the hollow pipe inner ends 16 and 17 welded as at 18 and 19 to the internal peripheries of the end flanges. Each pipe is also welded as at 21 to its end flange.

The valve assembly comprises a generally annular rigid metal body 22 having flat opposite side faces 23 and 24 lying in parallel planes perpendicular to the flow axis indicated by the arrow F. The circular cylindrical inner periphery 25 of the body is coaxial with the flow axis.

In the assembly the axial distance between opposed parallel flat end faces 26 and 27 of the end flanges is such that the valve body slides radially therebetween into the FIG. 1 position, with annular faces 23 and 26 in flush contact around he flow axis and annular faces 24 and 27 in flush contact around the flow axis. The valve assembly 11 may be tightly axially secured in position as by a series of studs 28 and 29 and/or through bolts passing through the respective flanges. If needed gaskets can be provided between faces 23, 26 and 24, 27.

A cover plate 31 is secured upon the upper end of body 22 as by capscrews 32. Considering the flow axis as horizontal, body 22 is formed with a vertical aligned upper and lower bores 33 and 34 whose axis X is a diameter of the circular inner periphery 25 of the valve body and is the axis of rotation of the movable valve member or disc as will appear. A cylindrical valve stem 36 extends through suitable bushings and seals in both bores 33 and 34 and projects upwardly rotatably through an opening 37 in plate 31 to mount a suitable operator (not shown).

Stem 36 is rotatably mounted axis X in each bore. The inner end of bore 33 has a reduced section defining an axially facing annular shoulder 37 on which seats an axially rigid metal journal sleeve 38 provided with inner and outer annular grooves mounting resilient O-ring seals 39 and 41 compressed radially between the sleeve and the bore and stem respectively.

Above seal ring 38 is a rigid metal spacer ring 42 loosely surrounding the stem within bore 33, and above ring 42 is an outer journal sleeve 43 snugly slidable within bore 33 and having inner and outer annular grooves mounting radially compressed resilient O-rings 44 and 45 surrounding stem 36 and engaging bore 33.

An annular assembly of shims 46 surrounds stem 36 at the upper open end of bore 32 in engagement with sleeve 43 and the underside of plate 32, and sleeves 38 and 43 and ring 42 are thereby axially urged in tight end assembly in bore 33 toward shoulder 37.

The inner end of bore 34 is reduced to provide axially outwardly facing shoulder 47 seating a journal sleeve 48 having inner and outer annular grooves mounting radially compressed resilient O-rings 49 and 51 engaging stem 36 and bore 34 respectively. Another journal sleeve 52 surrounds stem 33 within bore 34 in axial abutment with sleeve 48 and mounting radially compressed resilient O-ring seals 53 and 54 in respective inner and outer grooves.

The lower end of bore 34 is enlarged at 55 and closed by a cover plate 56 secured to the body as by screws 57.

The lower end of valve stem 36 is of reduced diameter at 58 where it extends into bore section 55, and it is surrounded by an annular hard metal thrust plate 59 axially seated on a body shoulder 61 where the bore increases in diameter.

Secured nonrotatably upon the lower end of the valve stem within bore section 55, as by a dowel pin 62 and a machine screw 63, is a thrust retainer block 64. An annular flat bearing ring 65 is interposed between the adjacent flat end faces 66 of retainer 64 and 67 of thrust plate 59. Another flat bearing ring 68 is interposed between flat end faces 69 of retainer 64 and 71 on cover 56. The upper flat end face 72 of thrust plate 59 seats on the smooth annular face provided by shoulder 61.

All of faces 61, 72, 66, 67, 68 and 69 lie in parallel planes at right angles to the turn axis X. A static resilient O-ring 73 is compressed between the cover 56 and the valve body.

A movable valve member in the form of a disc 75 is secured on stem 36, as by one or more dowel pins 76 that extend through the stem. Disc 75 is preferably a solid metal body such as a casting having a bore 77 formed therethrough to mount it on stem 36. An annular continuous recess 78 extends in a circle around the outer periphery of disc 75. The open outer end of recess 78 is disposed medially in an edge surface region that extends peripherally around the disc. This edge surface region could be any toroidal or conical surface that lies within a sphere centered at 0 in FIG. 1, and in the illustrated form of the invention comprises inclined conical surfaces 79 and 80 at opposite sides of the recess, for a purpose to appear. The central plane of the recess indicated at Y in FIG. 1 lies on a diameter of the edge region, and plane Y is disposed at a predetermined angle $a$ relative to the stem axis X which is the axis of rotation of the disc. In the preferred embodiment angle $a$ is made as small as possible to permit the seal to lie in plane Y, as shown in FIG. 1.

Recess 78 in this embodiment has equally tapered sidewalls 81 converging toward the bottom wall 82, so that the recess is widest around its open mouth. A flexible seal member in the form of an annular one-piece seal ring 83 of resilient material such as a synthetic rubber is mounted in recess 78. Seal ring 83 has sidewalls 84 converging toward its inner periphery 85, and the outer peripheral portion 86 of the seal ring projects out of the recess where it is so formed that in the relaxed valve open condition of FIG. 2 outer peripheral surface 87 is smoothly contoured and symmetrically arcuate in radial cross section, usually on a substantially circular curve in section about an axis lying within the seal ring.

In the invention, seal ring 83 does not fill recess 78. The seal ring sidewalls 84 are preferably secured as by cementing in full surface bonding relation to corresponding sides 81 of the recess, so that the seal ring is immovably and permanently anchored at opposite sides within recess 78 with its inner periphery 85 spaced outwardly from recess bottom 82 so as to provide an unoccupied annular space or void within the seal indicated at 89. The sidewall bond is a pressuretight seal. By providing this tapered wall engagement of the seal ring with the sides of the recess, the cement is not scraped off the recess walls during insertion of the ring. Also the bond between the seal ring and the recess may be strengthened by the hoop tension of an undersized resilient tapered ring 83 exerting a wedging and binding action that increases the engagement pressure at the bonded surfaces.

A series of vent passages 91, usually six spaced at about 60° apart, are formed radially through seal ring 83, in the central plane to open inwardly into space 89. Passages 91 are small in width compared to the width of the seal ring 83.

An annular rigid metal seat 92 is permanently bonded to the inner periphery 25 of the valve body, and seat 92 has a smooth cylindrical inner peripheral surface 93 that serves as a valve seat coacting with the valve disc. Seat 92 is preferably an inlay of metal such as Stellite, Hastelloy or stainless steel that is both erosion and corrosion resistant. A diameter of surface 93 is disposed at angle $a$ with respect to a diameter of the body periphery 25 passing through bores 33, 34.

The parts are so dimensionally located that when disc 75 is in the valve closed position shown in FIG. 1 the peripheral seating surface 93 on the body closely surrounds the peripheral edge region of the disc, but the surfaces 93, and 79, 80 are out of metal to metal contact as shown in FIG. 3, and do not contact during opening or closing of the valve.

Sealing is effected by engagement of the projecting periphery of seal ring 83 with valve seat surface 93, during which the seal ring is resiliently deformed (see FIG. 3) so that its outer periphery has a tight annular band contact with surface 93. Rubber being substantially incompressible, and the sides of ring 83 being immovable with respect to recess 78, space 89 allows displacement of material of the deformed seal ring thereinto. The volume of space 89 is greater than the maximum radially inwardly displaced volume of ring 83 when the seal ring is under maximum compression. It is a feature of the invention that the bonded sides of the seal ring maintain it against displacement out of recess 78. Depending on the direction of flow, the bond between the seal ring and recess sides at the upstream side of the seal deprives the upstream side of the seal ring of any appreciable area upon which the upstream pressure can act to distort the seal ring out of the recess. This is especially important when the disc is moving toward open position in the downstream direction.

As shown in FIG. 3, in the closed position of the valve there is a substantially circumferentially and transversely continuous relatively wide zone of sealing engagement between the continuous uninterrupted seating surface 93 and continuous substantially uninterrupted outer peripheral surface of compressed resilient seal ring 83. The outer peripheral surface of ring 83 contains a series of small openings provided by the outer ends of vent passages 91, but these openings are small as compared to the width of the zone and do not affect the continuity of the relatively wide annular seal.

Referring to FIG. 1, stem 36 is formed with an annular groove 94 within the disc to mount a radially compressed resilient O-ring 95 providing a static seal between stem 36 and bore 77, and this prevents leakage along the valve stem when the valve is in closed position.

Figure 4:
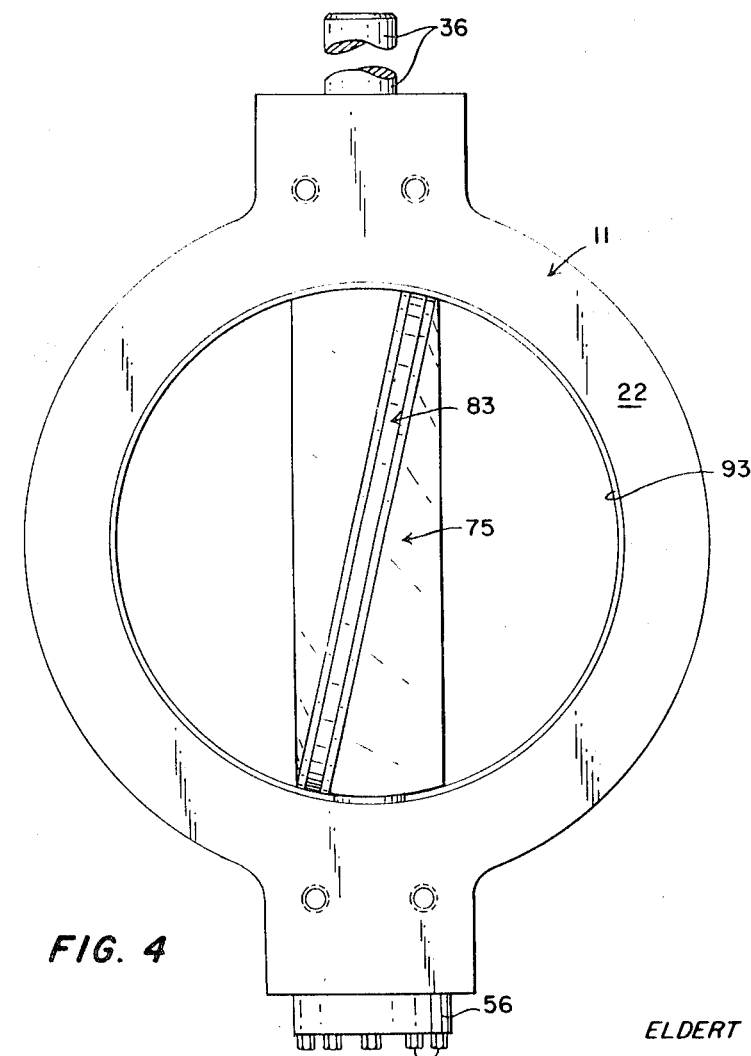
FIG. 4 is an end elevation showing the butterfly-type valve in open condition.

When the valve is in open condition, disc 75 is turned by rotation of stem 36 about 90° from FIG. 1 to the position shown in FIG. 4 and seat ring 83 is relaxed and expanded as shown in FIG. 2. When the valve is in closed condition, disc 75 is turned to the FIG. 1 position where seat ring 83 engages seating surface 93 as shown in FIG. 3. As the valve disc swings about the axis of stem 36 into closed position, apparently upstream fluid will communicate through passages 91 with space 89 at the bottom of the recess to create a pressure energized seal at the downstream side of the passages 91 as shown in FIG. 3a.

FIG. 3b illustrates the pressure equalization that takes place as the valve starts opening, showing that side of the valve disc that is moving downstream in the direction of the arrow. The other side of the valve disc is moving in the opposite direction and its pressure remains the same. As the outer ends of passages 91 are uncovered, the pressure in space 89 equalizes with the downstream pressure, preventing excessive distortion of seal ring 83.

By providing the annular space or void 89 of greater volume than the displaced material of deformed seal ring 83, hydrostatic compression of the seal ring is avoided, and the seal ring retains its flexibility and capability of resiliently sealing under operation conditions.

Thus the provision of vent passages 91 accomplishes a threefold advantage.

First, as pointed out they equalize the fluid pressure in space 89 with the line pressure, thus preventing deformation of seal ring 83 under balanced hydrostatic pressure.

Second, the high-fluid pressure in space 89 effectively pressure energizes the seal after the disc reaches closed position, so that the pressure in space 89 tends to deform seal ring 83 into more intimate contact with the seating face 93 when the valve is closed.

Third, when the valve disc is moved toward open position, the ends of passages 91 are cut off from upstream pressure and the pressure equalizes to downstream pressure thereby relaxing the resilient engagement of the seal ring with seating surface 93 and facilitating opening of the valve.

The sealing quality of the lip seal is preserved in the invention, but the disadvantage of maintaining sidewalls sealing contact during a wide separation of the rigid parts is avoided. By providing the cylindrical valve seat on an angle with respect to the flow axis smooth gradual compression of seal ring 83 in a continuous seal region is assured as it engages and moves over surface 93.

If desirable, the parts could be reversely arranged with the resilient seal ring 83' having its sidewalls bonded to the tapered sides of a recess in the cylindrical body surface 93' and projecting out of the recess into the path of the butterfly disc 75' as shown in FIG. 2a where corresponding parts as indicated by the similar numerals with primes. The arrangement in FIG. 1 is preferable because the hoop tension of the seal ring tends to maintain it in the recess.

Figure 6:
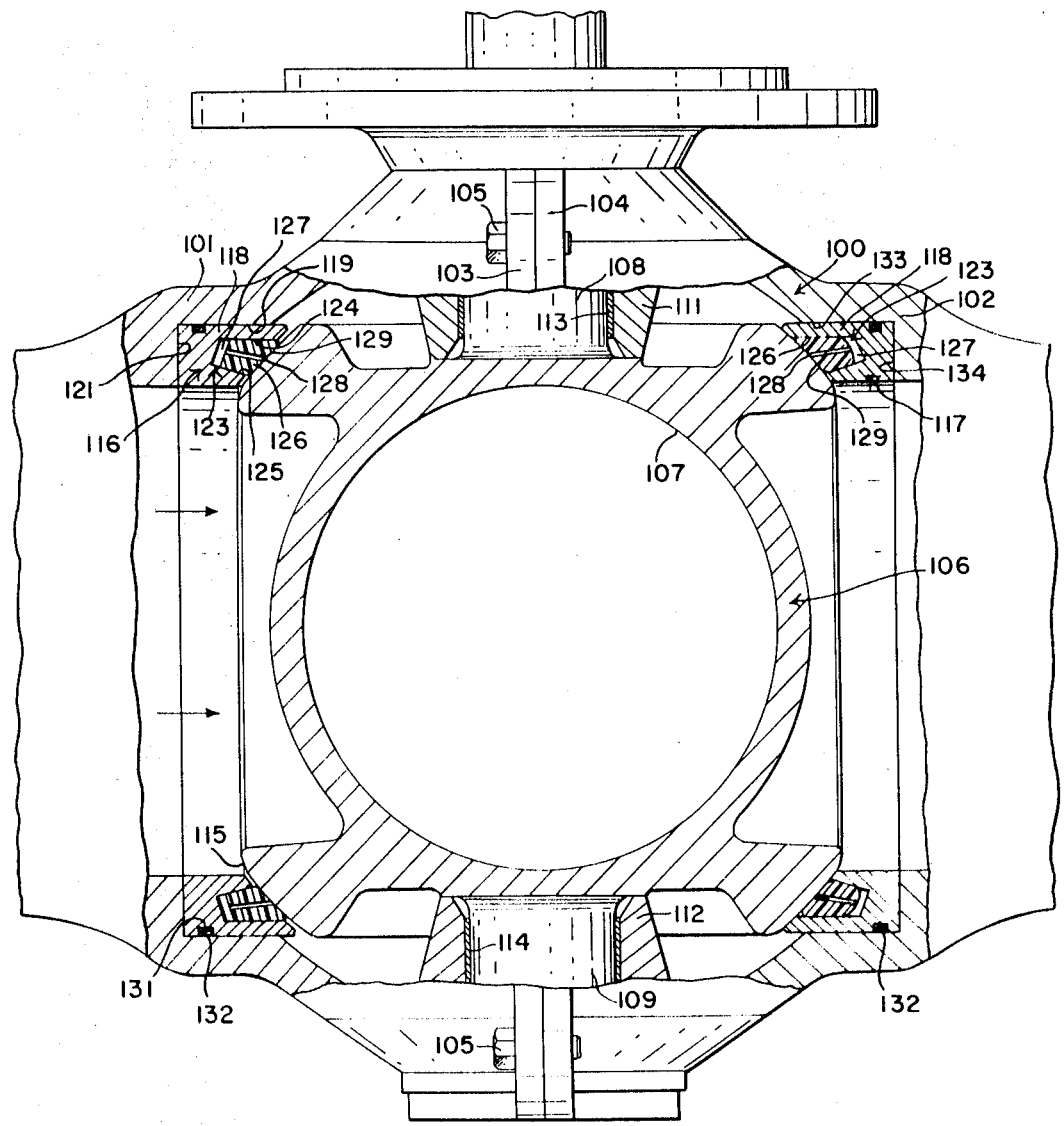
FIG. 6 is an elevation partially broken away and in section showing the invention as applied to a ball-type plug valve.

FIG. 6 shows the invention applied to a ball-type plug valve wherein the valve body 100 comprises opposite sides 101 and 102 formed with mating flanges 103 and 104 joined by bolts 105. The valve is shown in closed condition.

A ball-type plug 106 formed with a through port 107 has upper and lower cylindrical trunnions 108 and 109 respectively extending into opposed body bosses 111 and 112 lined with bushings 113 and 114. Plug 106 is formed with a seating surface 115 lying in a spherical envelope, and coacting with seat ring assemblies 116 and 117 surrounding the fluid inlet and outlet passages of the valve body. Seat rings 116 and 117 have annular spherical surfaces facing the plug surface 115. Rotation of plug 106 through 90° aligns port 107 with the body passages to open the valve.

Seat ring assembly 116 comprises a rigid metal annulus 118 seated in a body recess having a cylindrical surface 119 axially slidably receiving the seat ring assembly, and an axially facing surface 121 at right angles to the flow axis abutting the outer end of the annulus 118. Annulus 118 has an inner surface 122 of generally spherical contour formed with an axially facing annular recess 123 having outwardly diverging sidewalls 124 and 125.

A flexible seal member in the form of a resilient seal ring 126 is mounted in recess 123 with its tapered sidewalls bonded in full surface engagement with the sides of recess 123 in its inner periphery spaced to provide an annular space or void 127 in the bottom of recess 123. Ring 126 projects out of recess 123, and a series of circumferentially spaced passages 128 extend from the plug engaging surface 129 of the seat ring into space 127. Annulus 118 is formed with a peripheral groove 131 containing a resilient O-ring 132 compressed between the annulus and recess wall 119.

Figure 6A:
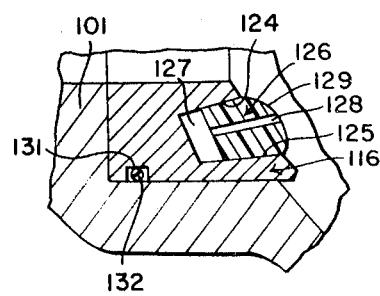
FIG. 6a is an enlarged fragmentary section showing the seat ring in relaxed condition.

The plug engaging surface 129 of resilient seal ring 126 is smoothly arcuate in contour when relaxed as shown in FIG. 6a and is deformed to provide tight annular band engagement with plug surface 115 when the valve is in open or closed condition. Compression of seal ring 126 results in deformation and displacement of seal ring material into space 127 but, since the seal ring sides are immovable with respect to the recess sidewalls, the seal ring does not displace bodily inwardly of recess 123 and the volume of space 127 is at least as great and usually greater than that of inwardly displaced volume of deformed seal ring 126. Essentially the seal ring of FIG. 6 is the same as that of FIGS. 1–3 except for its mounting in an annular seat ring assembly.

The seat ring assembly 117 at the other side of the plug is of similar construction and similarly axially slidable mounted in a body recess having a cylindrical wall 133 and an axially facing bottom 134, and similar reference numerals are applied to the corresponding elements.

Figure 7:
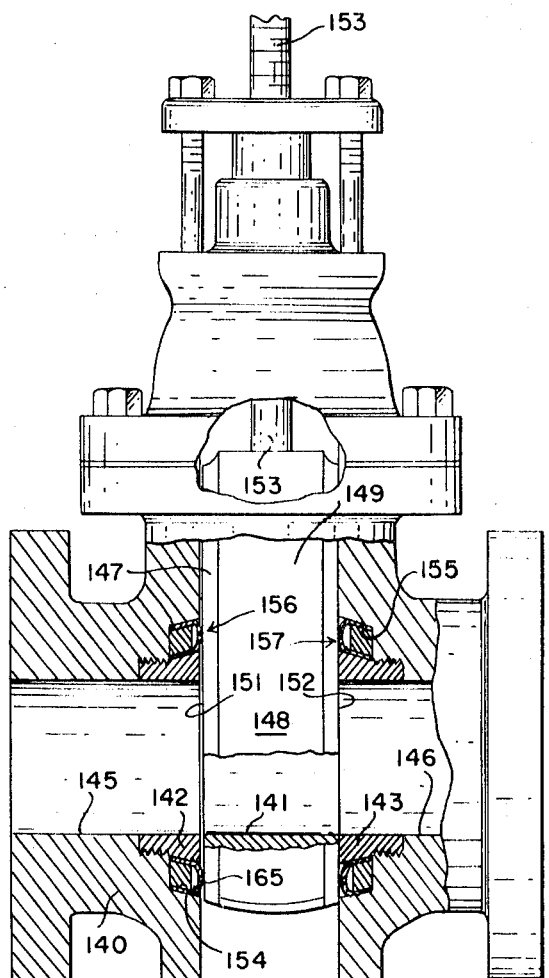
FIG. 7 is an elevation partially broken away and in section showing the invention applied to a gate valve and embodying a different seat ring structure and configuration suitable for a flexible metal seal.

FIG. 7 shows the invention applied to a gate valve having a main body member 140 containing aligned fluid passages 145 and 146 opening into the central body chamber 147.

A closure gate 148 in the form of a conduit gate 149 having opposite parallel sides 151 and 152 normal to the flow axis is mounted on a stem 153 for displacement between the valve open position in FIG. 7 where opening 141 aligns with the body passages, and a valve closed position in the lower part of chamber 147.

At opposite sides of chamber 147, the body fluid passages are surrounded by conical counterbores 154 and 155 surrounding identical annular seal rings 156 and 157.

Figure 8:
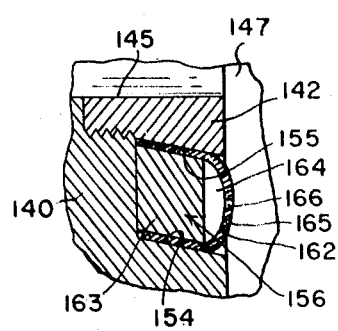
FIG. 8 is an enlarged fragmentary view in section showing the seat ring of FIG. 7 in relaxed valve open condition.

Seal ring 156 is a composite structure consisting of an annulus 162 of thin resilient sheet metal of generally U-shape in radial cross section with a closed rounded end projecting out of the counterbore. A support or spacer ring 163 of rigid material such as metal extends rigidly across the open end of ring 156. Ring 163 is preferably split for assembly. Ring 156 is held immovable by the mechanical clamping action of a threaded collar 142 having a conical clamping face 155 surrounding the adjacent periphery of ring 156. As collar 142 is drawn tight, seal ring 156 is clamped in fluidtight sealing relation between conical surfaces 154 and 155, ring 163 supporting it against collapse. As shown in FIG. 8, there is within the seal ring an annular space 164 into which the projecting part of annulus 162 is displaced when deformed by engagement with the gate, and the outer gate engaging surface 165 of the seal ring is of smooth arcuate contour when relaxed. A series of circumferentially spaced centered passages 166 vent space 164. Collar 142 forms with the body an effective body recess in which the seal ring 156 is disposed.

With the gate in closed position as shown in FIG. 7, resilient annulus 162 is deformed into a bandlike tight engagement with the gate surface 151, and space 164 is of sufficient volume to accommodate the deformed portion of annulus 162. The higher upstream pressure urges the gate to more highly compress the downstream seal ring 157. As shown in FIG. 7 the downstream side of the gate will bear against the body to limit deformation of the downstream seat ring. Passages 166 serve as a pressure equalizing arrangement similarly to passages 91 in FIGS. 1—3.

The annulus 162 may be conveniently formed by spinning a thin sheet of metal. It is desirable to use a metal of high yield strength and low modulus of elasticity to preserve elastic behavior. Ring 163 may be in the form of a relatively strong spring exerting adequate force to urge the annulus 162 into sealing relation with the sides of the recess.

Seal ring 157 is of the same construction and similarly mounted.

A similar arrangement could be used for a wedge shaped gate valve.

Figure 9:
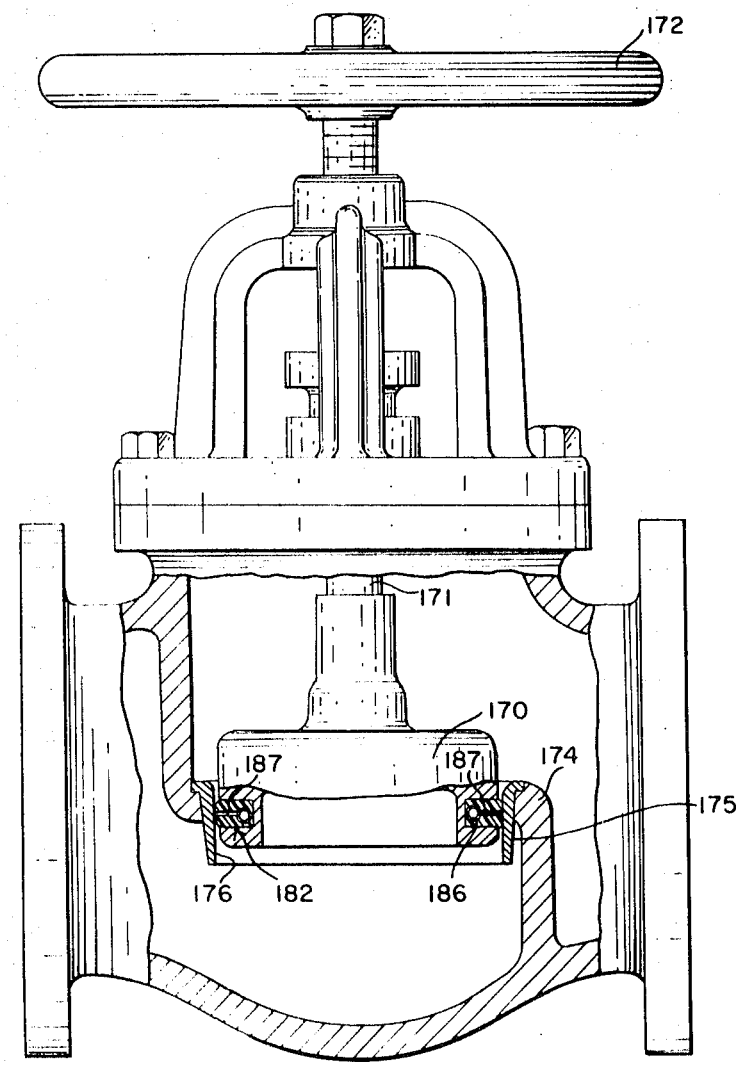
FIG. 9 is an elevation partially broken away and in section showing the invention as applied to a globe-type valve, and embodying a still further seat ring structure.
Figure 10:
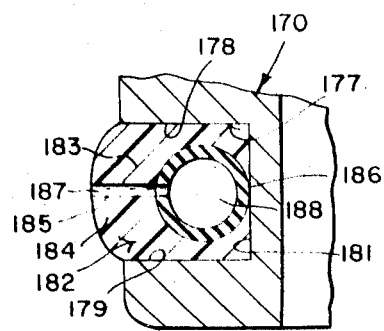
FIG. 10 is an enlarged cross section showing the seat ring of FIG. 9 in relaxed valve open condition.

FIGS. 9 and 10 show a further embodiment of the invention as applied to a globe valve wherein the movable valve member 170 is carried by a stem 171 raised or lowered by the rotation of handwheel 172. The valve comprises a body 173 formed with an internal boss structure defining an annular valve seat structure 174 between the body inlet and outlet passages wherein the valve seat is defined by a fixed rigid annular ring 175 of suitable wear and corrosion resistant material having an annular smooth seating surface 176.

Valve member 170 is formed with an annular recess 177 having parallel sidewalls 178 and 179 and a circular cylindrical bottom wall 181. A seal ring 182 is disposed in recess 177.

In practice it is usual to provide a resilient hollow ring 186 with an inner peripheral diameter about that of surface 181 and stretch ring 186 to pass it into recess 177 where it relaxes to the bottom. Then urethane forming a resilient annulus 183 is molded or cast into and around the recess. Then passages 187 are drilled through the urethane and ring 186 to the space 188 within ring 186. These small width passages 187 extend through the seal ring from surface 185 into the space 188 in the interior of ring 186 to provide the pressure equalizing feature in this embodiment.

The outer periphery 184 of annulus 183 projects out of the recess and when relaxed has a continuous valve member engaging surface 185 that is smoothly arcuate in radial cross section, similar to surface 87 of seal ring 83 in FIG. 2.

When the valve member 170 has been lowered to the closed position of FIG. 9, the annulus 183 is deformed with surface 185 providing a tight band seal engagement with valve seating surface 176. Deformation of annulus 183 causes inward displacement of the material which partially collapses ring 186 which is preferably more flexible than the urethane annulus. The volume of space 188 is such as to permit normal operational collapse of ring 186 to accommodate deformation of annulus 183 without eliminating the space.

Alternatively the resilient seat ring may be mounted in the seat ring 175.

In all of the foregoing embodiments the five essential features of the invention are present regardless of the type of valve and regardless of whether the seal ring is on the valve body or on a movable valve member. The term "seal ring means" as used in the claims includes both one-piece integral rings as in FIGS. 1 and 6 and composite ring structures such as in FIGS. 7 and 9.

1. A continuous annular recess is provided around the port in one of the members to be sealed.

2. A one-piece resilient seal ring is mounted within the recess so as to maintain continuous sealing contact at its periphery projecting out of the recess while its opposite sides are maintained in the continuous sealing contact without relative motion with respect to opposite sides of the recess, regardless of the mechanical and fluid forces acting on the seal.

3. The resilient seal ring has a smoothly contoured crown having positive interference fit with a mating rigid sealing surface of the other member to be sealed when the valve is closed.

4. A void or space is maintained within the seal of sufficient volume that is is not completely eliminated when interference is maximum.

5. The void or space is vented by means of one or more passages, small in width as compared to seal width, formed through the resilient seal ring essentially in the plane of symmetry of the ring and recess.

The structures of the seal rings shown for the embodiments of FIGS. 1–5, 7 and 8 and 9 and 10 are essentially interchangeable between the embodiments as all possess the foregoing novel features. The void or space into which seal ring material is displaced during deformation may be within the groove or within the seal ring itself.

The invention may be applied to any other valve or like structure having a flexible seal between relatively moving parts such as spool valves, tapered plug valves and the like.

What is claimed and desired to be secured by Letters Patent is:

1. In a valve assembly comprising two relatively movable members one of which is provided with a relatively rigid continuous seating surface and the other of which is provided with flexible sealing means adapted for engagement with said seating surface for closing the valve, said other member having an annular recess and said sealing means comprising seal ring means that is substantially symmetrical about a central plane normal to its axis disposed within said recess and having a resilient annular portion projecting out of said recess for deformable contact with said rigid seating surface in a circumferentially continuous surface zone when the valve is closed and having its opposite side surfaces fixed in sealing relation to the adjacent side surfaces of said recess, means on said other member providing an annular space into which a portion of said seal ring means is displaced during said deformation, said space being of greater volume than the volume of the seal ring means displaced thereinto, and means for venting said space through said seal ring means, said space being otherwise sealed, comprising a plurality of separate circumferentially spaced passages through said seal ring means all having their inner ends open into said space and their outer open ends disposed substantially in said plane of symmetry of said seal ring means, the outer ends of said passages being closed by said one member when the valve assembly is in closed condition.

2. In the valve assembly defined in claim 1, the opposite sides of said seal ring means being surface bonded to the sides of said recess.

3. In the valve assembly defined in claim 1, said seal ring means being mechanically secured within said recess.

4. In the valve assembly defined in claim 1, said seal ring means being a continuous annulus of resilient material and said space being disposed between said annulus and the bottom of said recess.

5. In the valve assembly defined in claim 4, said annulus having its opposite sides adhesively bonded to said recess sides.

6. In the valve assembly defined in claim 1, said space being within said seal ring means.

7. In the valve assembly defined in claim 1, said seal ring means being a composite structure having means therein defining and enclosing said space.

8. In the valve assembly defined in claim 1, said seal ring means comprising a composite structure wherein said projecting resilient portion is a thin metal section mechanically clamped internally over a relatively rigid spacer ring, with said annular space being disposed between said resilient portion and the spacer ring.

9. In the valve assembly defined in claim 8, said seal ring means comprising a generally U-shaped thin metal element the closed end of which defines said resilient annular seat engaging portion, and said spacer ring bridging the open end of said element within the recess permitting clamping and sealing of said element.

10. In the valve assembly defined in claim 9, an internal collar mounted on said body to define said recess therewith and having annular clamping engagement with said seal ring means.

11. In the valve assembly defined in claim 1, said seal ring means comprising a composite structure consisting essentially of a hollow flexible walled annulus around which is molded or cast a resilient surrounding annulus that has its opposite sides immovable with respect to said recess and projects out of the recess to provide said seat engaging portion, the interior of said hollow annulus providing said space.

12. In the valve assembly defined in claim 1, said one valve member being a valve body having a cylindrical seating surface, and said other member being a pivoted disc having said recess formed in its outer periphery.

13. In the valve as defined in claim 1, said one valve member being a rotatable plug, and said other valve member being a valve body wherein the seal ring means is mounted in rigid seat rings surrounding the flow passage at opposite sides of the plug.

14. In the valve assembly defined in claim 1, said one valve member being a slidably mounted gate having seating surfaces on opposite sides, and said other valve member is a valve body having opposed annular recesses facing the gate for mounting the seal ring means.

15. In the valve assembly defined in claim 1, said one valve member being a valve body having a port defining annulus on the inner periphery of which said seating surface is formed, and said other valve member being an axially movable element having a peripheral surface of revolution in which said recess if formed.

16. The valve assembly defined in claim 1, wherein said zone comprises continuous annular areas of contact between the seal ring means said seating surface at opposite sides of said recess when the valve is closed.

17. In the valve assembly defined in claim 1, said projecting annular portion of said seal ring having a sealing surface that is of arcuate transverse contour when relaxed, as when the valve is open, and the outer ends of said passages being disposed in said arcuate surface which is otherwise continuous.

18. In the valve assembly defined in claim 1, all of said passages being of materially smaller width than said seal ring means.

19. In the valve assembly defined in claim 1, said one valve member being a pivoted disc having a cylindrical seating surface around its outer periphery, and said other valve member is a valve body having said recess formed to open internally.

20. In a valve of the type wherein a body member has a flow passage therethrough and a closure member is movable between positions where it permits or blocks flow through said passage and one of said members mounts an annular flexible member in pressurized sealing engagement with a rigid surface of the other member when the valve is closed, characterized by means defining a peripheral recess in said one member, a relatively solid annulus of flexible material mounted in said recess having a deformable seating portion projecting from said recess, said deformable seating portion having two circumferentially continuous relatively wide zones of sealing engagement with said rigid surface at opposite sides of said recess when the valve is closed, and the lateral sides of said annulus being in sealing contact with the lateral sides of said recess and fixed against relative motion with respect thereto, means providing an annular void radially inwardly of said deformable surface of sufficient volume as not to be filled when said annulus engages said rigid surface under maximum pressure, and vent means for said void comprising at least one substantially radial passage through said annulus end open to said void and end disposed in a plane normal to the axis of said annulus intermediate said zones of sealing engagement, the outer end of said vent passage being closed by said other member in closed valve condition.

21. In the valve defined in claim 20, said annulus being an integral elastomer element with the sides of said annulus being bonded directly to the sides of said recess.

22. In the valve defined in claim 20, said recess having sidewalls that diverge outwardly from the bottom, and said annulus having correspondingly tapered side walls.

23. In the valve defined in claim 20, said valve being the butterfly type wherein said closure member is a disc rotatable on an axis extending across the flow axis, said annulus being an integral elastomer element mounted in residual hoop tension within said recess, and said void being a space between said annulus and the bottom of said recess.

24. In the valve defined in claim 20, there being a plurality of circumferentially spaced vent passages through said annulus all having their inner ends open to said void and their open outer ends disposed in said plane normal to the axis of said annulus.